United States Patent
Kim

(10) Patent No.: US 9,162,640 B2
(45) Date of Patent: Oct. 20, 2015

(54) BUMPER COVER FIXING BRACKET OF VEHICLE

(71) Applicant: Hyundai Motor Company, Seoul (KR)

(72) Inventor: Mincheol Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/085,657

(22) Filed: Nov. 20, 2013

(65) Prior Publication Data

US 2014/0353991 A1 Dec. 4, 2014

(30) Foreign Application Priority Data

May 30, 2013 (KR) .................. 10-2013-0062042

(51) Int. Cl.
*B60R 19/24* (2006.01)

(52) U.S. Cl.
CPC ........... *B60R 19/24* (2013.01); *B60R 2019/247* (2013.01)

(58) Field of Classification Search
CPC .... B63B 17/02; B60R 13/0206; B60R 19/24; B60R 2019/247
USPC .......... 296/187.01, 180.1, 198, 191, 180; 293/126, 155
See application file for complete search history.

(56) References Cited

U.S. PATENT DOCUMENTS

| 5,226,695 | A * | 7/1993 | Flint et al. ............... 296/191 |
| 7,207,617 | B2 * | 4/2007 | Pelini ...................... 296/29 |
| 8,029,049 | B2 * | 10/2011 | Ito et al. ................. 296/198 |
| 2013/0076050 | A1 * | 3/2013 | Hirose .................... 293/126 |

FOREIGN PATENT DOCUMENTS

| JP | 2007-131281 A | 5/2007 |
| JP | 2010-120560 A | 6/2010 |
| KR | 10-0974749 B1 | 8/2010 |

* cited by examiner

*Primary Examiner* — Joseph D Pape
*Assistant Examiner* — Dana Ivey
(74) *Attorney, Agent, or Firm* — Morgan, Lewis & Bockius LLP

(57) ABSTRACT

A bumper cover fixing bracket mounted between a fender panel and a bumper cover includes a main supporting member having an upper end attached to an upper member, an auxiliary supporting member having a lower end connected to the main supporting member so as to form a Y-shape and an upper end attached to a wheel house front member, and a fastening member coupled to a lower end of the main supporting member and having one side and the other side mounted on the fender panel and the bumper cover, respectively.

13 Claims, 5 Drawing Sheets

BUMPER COVER FIXING BRACKET OF VEHICLE

CROSS-REFERENCE TO RELATED APPLICATION

The present application claims priority to Korean Patent Application No. 10-2013-0062042 filed on May 30, 2013, the entire contents of which is incorporated herein for all purposes by this reference.

BACKGROUND OF THE INVENTION

1. Field of the Invention

The present invention relates to a bumper cover fixing bracket of a vehicle, and more particularly, to a bumper cover fixing bracket of a vehicle, which engages a fender panel and a bumper cover so as to secure stiffness.

2. Description of Related Art

In general, a vehicle has front and rear bumpers mounted at the front and rear sides of a vehicle body. When the vehicle collides with another vehicle or a fixed object, the front and rear bumpers absorb the impact to secure the safety of passengers and to minimize a deformation of the vehicle body.

The front bumper includes a bumper beam formed therein, a stay connecting the bumper beam to the vehicle body, an energy absorber disposed at the front side of the bumper beam so as to absorb an impact, and a bumper cover covering the bumper beam and the energy absorber.

The bumper cover has both ends mounted on the fender panel, and a fixing bracket 100 is interposed therebetween to engage and fix the bumper cover and the fender panel.

As illustrated in FIG. 1, the fixing bracket 100 includes a supporting member 101 attached to a wheel house front member 110 and a fastening member 103 attached to a side surface of the supporting member 101. The bumper cover and the fender panel are mounted on the fastening member 103.

The supporting member 101 of the fixing bracket 100 is formed to support a load in an X-axis direction, that is, in a longitudinal direction of the vehicle body.

The above-described supporting member 101 is welded and coupled to the wheel house front member 110 formed in an L-shape at an upper member 120.

The supporting member 101 is made of a thick tube member to secure stiffness thereof, and a separate reinforcement member 130 capable of securing the stiffness of the vehicle body is mounted on an inner surface of the supporting member 101 so as to join the supporting member 101.

Furthermore, the fastening member 103 formed in a triangle shape has one side attached to the side surface of the supporting member 101.

The fender panel and the bumper cover are mounted at one side and the other side of the fastening member 103, respectively.

According to the recent design specification, a variety of fixing brackets with a narrow engine room have been launched on the market. In the fixing brackets, a large head lamp is attached at a front side surface of the vehicle body so as to reduce protrusion of the upper member 120, a distance between the bumper cover and the upper member 120 at the side surface of the vehicle body is increased, and the wheel house front member 110 is formed in an oblique direction at the upper member 120.

Thus, the fixing bracket 100 having the above-described structure has difficulties in dealing with the increased distance between the upper member 120 and the bumper cover and inserting a separate reinforcement member 130 capable of securing stiffness into the inner surface because the fixing bracket 100 has a narrow engine room. Therefore, the stiffness of the fixing bracket 100 supporting the bumper cover and the fender panel inevitably decreases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bumper cover fixing bracket of a vehicle, which is capable of reducing a gap between a bumper cover and a fender panel so as to cope with the recent design in which a distance between an upper member and a bumper cover at a side surface of a vehicle body is increased, securing stiffness thereof, and omitting a separate reinforcement member to reduce a cost and weight.

In an aspect of the present invention, a bumper cover fixing bracket mounted between a fender panel and a bumper cover, may include a main supporting member having an upper end attached to an upper member, an auxiliary supporting member having an upper end attached to a wheel house front member, and a lower end connected to the main supporting member between the upper end and a lower end of the main supporting member to form a Y-shape with the main supporting member, and a fastening member coupled to the lower end of the main supporting member and having one side and the other side mounted on the fender panel and the bumper cover, respectively.

The main supporting member may have a bent portion formed to support loads in X-axis, Y-axis, and Z-axis directions.

The main supporting member is attached to face a downward oblique direction from the upper member.

The main supporting member may have an upper end portion bent in a Y-Z-axis direction and a lower end portion bent in an X-Z-axis direction, based on the bent portion The bent portion may have a welding flange formed at both lateral sides thereof in an oblique direction with respect to the bent portion.

The auxiliary supporting member may include a welding portion formed in an oblique direction to correspond to a position of the welding flange, and a connection portion extended and bent from the welding portion and attached to the front member.

The welding portion of the auxiliary supporting member is housed in the bent portion through the welding flange and welded to the welding flange in a state where the welding portion overlaps the main supporting member in the bent portion thereof.

The connection portion is bent in a Z-X-axis direction.

The fastening member is formed in a triangle shape, and may have a flange portion formed on one side thereof so as to be engaged with a lower front portion of the main supporting member through a bolt.

The auxiliary supporting member may have a bead formed in a longitudinal direction thereof.

The wheel house front member to which the auxiliary supporting member is attached is formed in an oblique direction from the upper member.

The main supporting member is made of a rectangular tube.

The auxiliary supporting member is made of a rectangular tube.

According to the exemplary embodiment of the present invention, it is possible to reduce a gap between the bumper cover and the fender panel and secure the stiffness of the fixing bracket, in order to cope with the recent design specification in which the engine room space is narrow and the distance between the upper member and the bumper cover at the side surface of the vehicle body is increased, because the wheel house front member is formed in an oblique direction from the upper member.

Furthermore, since a separate reinforcement member capable of securing stiffness among a wheel guard, a washer reservoir tank, and a head lamp does not need to be installed to join the fixing bracket, the cost and weight may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
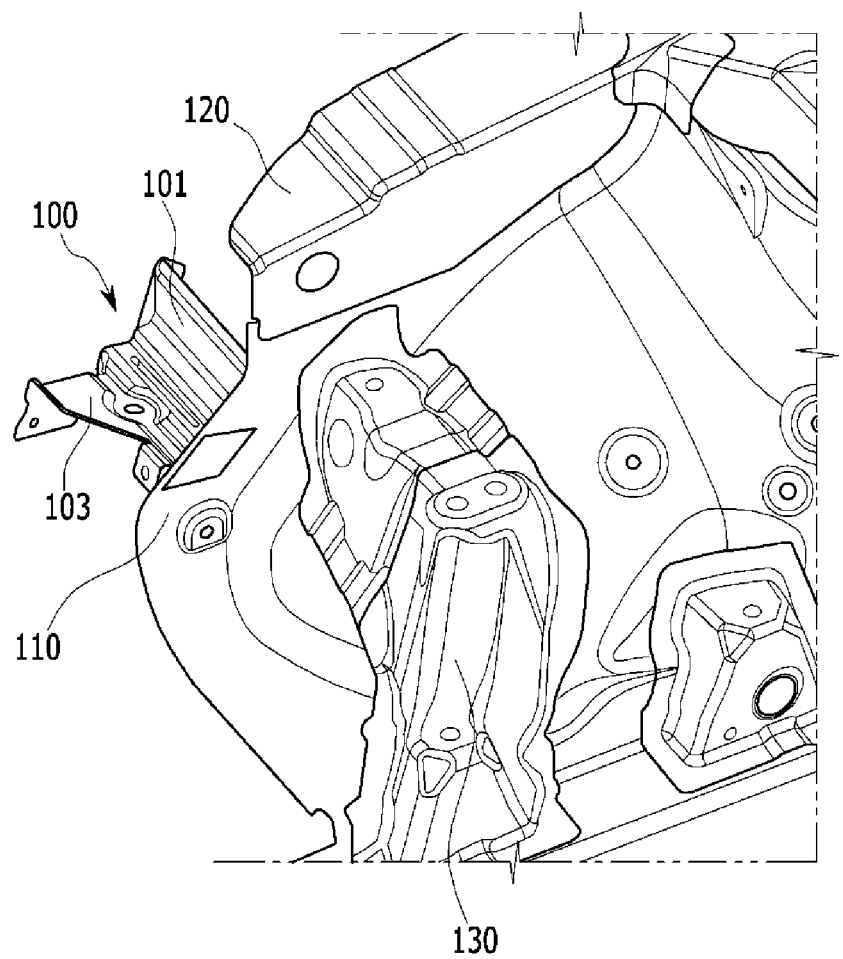
FIG. 1 is a diagram illustrating a bumper cover fixing bracket according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

The exemplary embodiments and drawings of the present specification are provided to describe a preferred exemplary embodiment of the present invention, and do not limit the technical idea of the present invention. Thus, it should be understood that various modifications and equivalent embodiments may be made at the application time.

Figure 2:
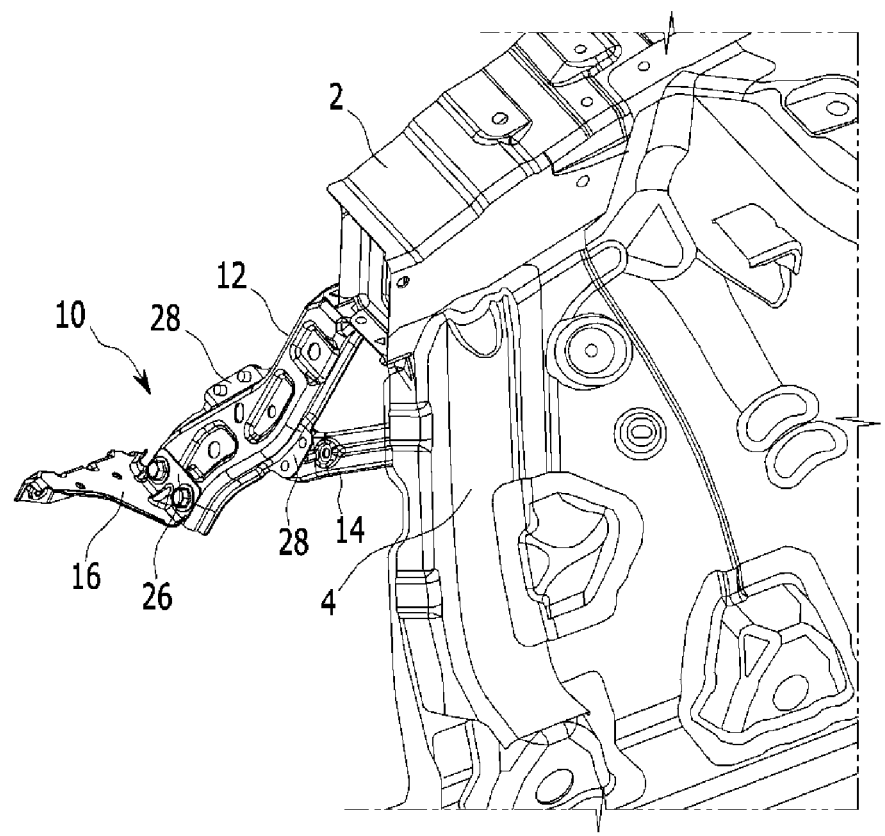
FIG. 2 is a diagram illustrating a bumper cover fixing bracket according to an exemplary embodiment of the present invention.
Figure 3:
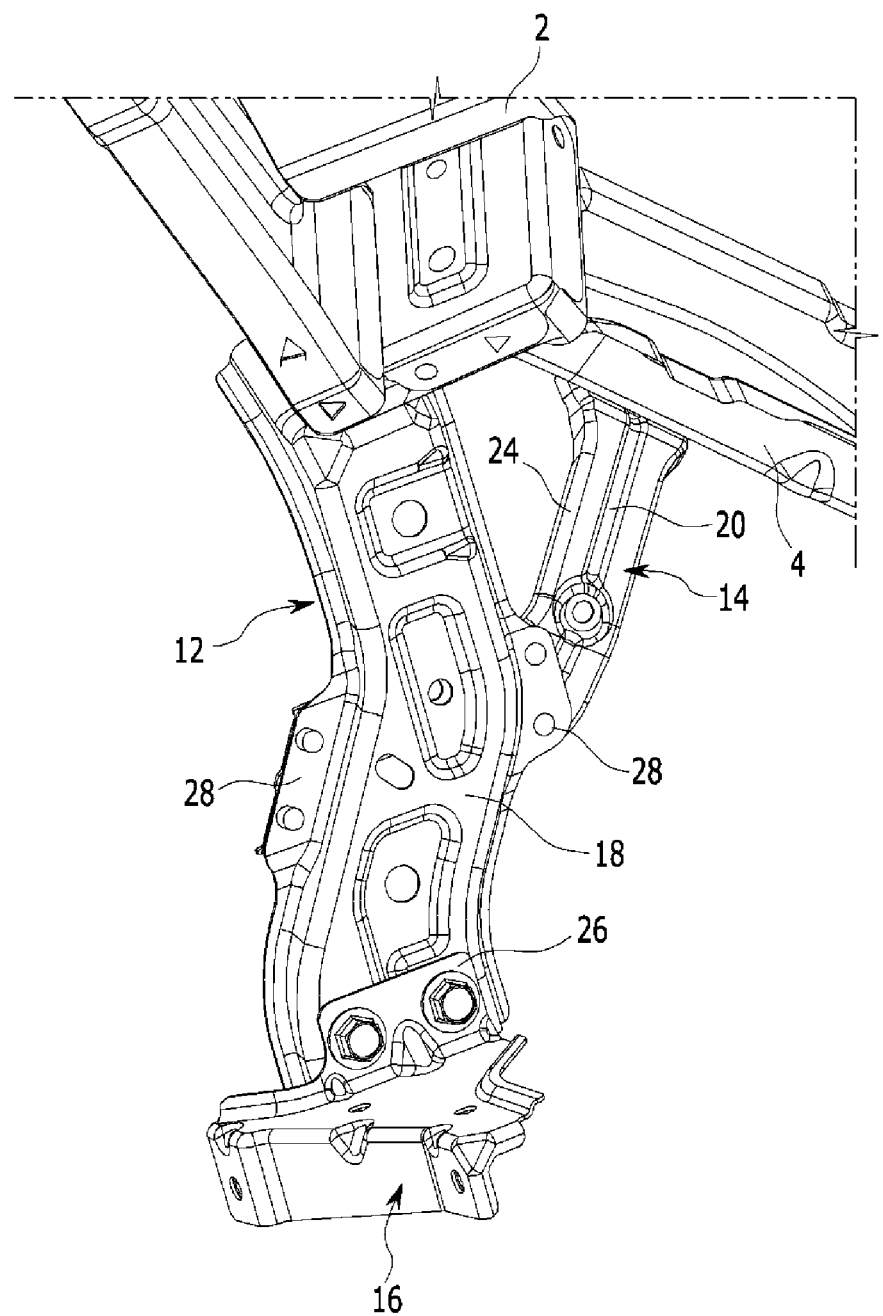
FIG. 3 is a perspective view of the bumper cover fixing bracket according to the exemplary embodiment of the present invention.
Figure 4:
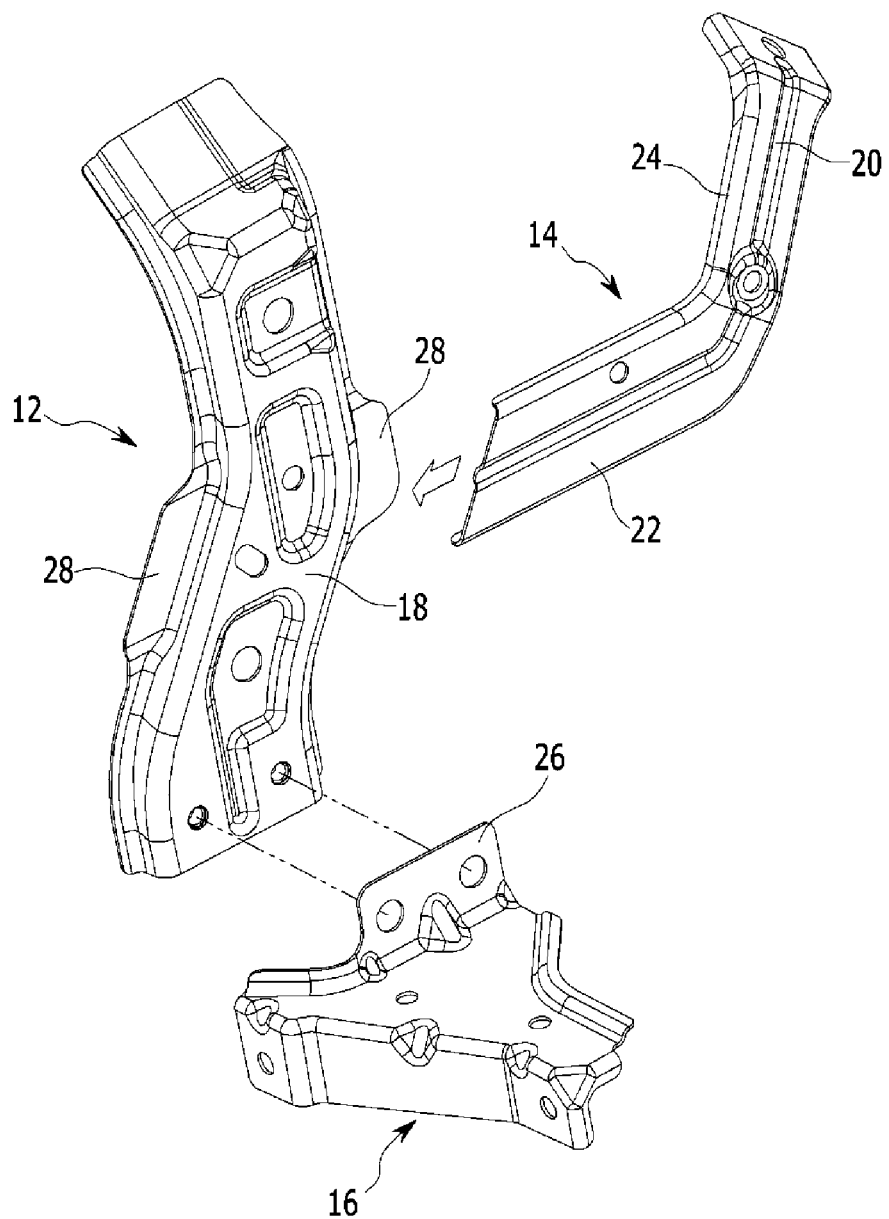
FIG. 4 is an exploded perspective view of the bumper cover fixing bracket according to the exemplary embodiment of the present invention.
Figure 5:
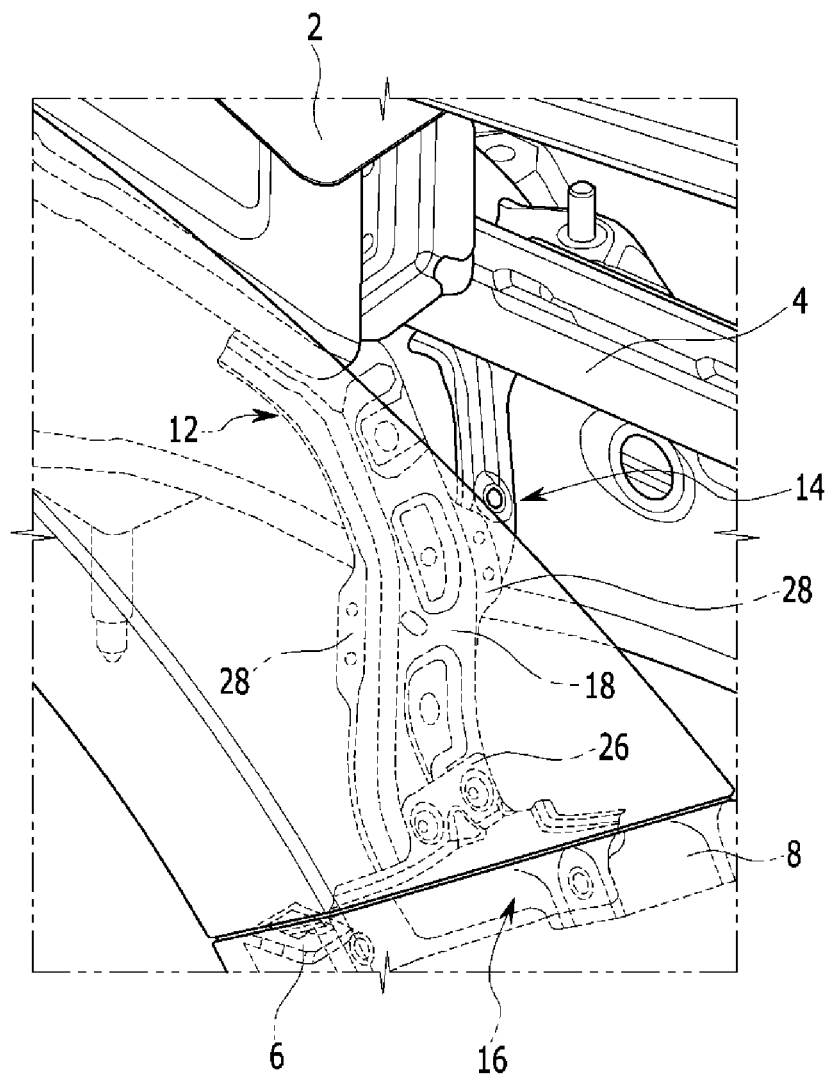
FIG. 5 is a diagram illustrating a state in which the bumper cover fixing bracket according to the exemplary embodiment of the present invention is mounted.

FIG. 2 is a diagram illustrating a bumper cover fixing bracket according to an exemplary embodiment of the present invention FIG. 3 is a perspective view of the bumper cover fixing bracket according to the exemplary embodiment of the present invention, FIG. 4 is an exploded perspective view of the bumper cover fixing bracket according to the exemplary embodiment of the present invention, and FIG. 5 is a diagram illustrating a state in which the bumper cover fixing bracket according to the exemplary embodiment of the present invention is mounted.

Referring to FIGS. 2 to 5, the bumper cover fixing bracket 10 according to the exemplary embodiment of the present invention includes a main supporting member 12 attached to an upper member 2, an auxiliary supporting member 14 attached to a wheel house front member 4, and a fastening member 16 mounted on a fender panel 6 and a bumper cover 8.

In the bumper cover fixing bracket 10 according to the exemplary embodiment of the present invention, the main supporting member 12 and the auxiliary supporting member 14 are bent and coupled to each other so as to support loads in X-axis, Y-axis, and Z-axis directions, and the fastening member 16 is mounted at the bottom of the main supporting member 12.

The X-axis direction is defined as the longitudinal direction of the vehicle body, the Y-axis direction is defined as the widthwise direction of the vehicle body, and the Z-axis direction is defined as the height direction of the vehicle body.

The main supporting member 12 according to the exemplary embodiment of the present invention is made of a rectangular tube which is bent to support the loads in the X-axis, Y-axis, and Z-axis directions.

More specifically, the main supporting member 12 has a bent portion 18 formed in the center thereof. Based on the bent portion 18, an upper end portion of the main supporting member 12 is bent in a Y-Z-axis direction, and a lower end portion of the main supporting member 12 is bent in an X-Z-axis direction.

The main supporting member 12 formed in the above-described manner is attached to the bottom of the upper member 2 so as to face a downward oblique direction from the upper member 2.

The auxiliary supporting member 14 attached to the wheel house front member 4 is welded to the bent portion 18 of the main supporting member 12 in a state in which the auxiliary supporting member 14 and the main supporting member 12 overlap each other.

At both sides of the bent portion 18, a welding flange 28 welded to overlap the auxiliary supporting member 14 is formed in an oblique direction.

The auxiliary supporting member 14 is made of a rectangular tube which is bent to support the loads in the Z-axis and X-axis directions.

The auxiliary supporting member 14 has a bead 20 formed in a longitudinal direction thereof.

The auxiliary supporting member 14 includes a welding portion 22 formed at the bottom thereof and a connection portion 24 extended and bent from the welding portion 22.

The welding portion 22 is formed in an oblique direction to correspond to the welding flange 28 of the bent portion 18.

Furthermore, the welding portion 22 is inserted into the bent portion 18 of the main supporting member 12 so as to overlap the bent portion 18, and welded and joined to the welding flange 28.

As described above, the joined portions of the main supporting member 12 and the auxiliary supporting member 14, which are welded to overlap each other in an oblique direction, do not easily come off due to a load, and have a strong structure.

The connection portion 24 of the auxiliary supporting member 14 is extended from the welding portion 22 so as to be bent in the Z-X-axis direction.

The top of the connection portion 24 is attached to the wheel house front member 4 so as to support the loads in the Z-axis and X-axis directions.

The bottom of the main supporting member 12 is coupled to the fastening member 16 mounted on the fender panel 6 and the bumper cover 8.

The fastening member 16 is formed in a triangle shape, and has a flange 26 formed on one side thereof. The flange 26 is engaged with the bottom of the main supporting member 12 through a bolt.

The flange 26 of the fastening member 16 is coupled to the lower front portion of the main supporting member 12.

One side of the fastening member 16 is mounted on the fender panel 6, and the other side thereof is mounted on the bumper cover 8.

The bumper cover fixing bracket 10 according to the exemplary embodiment of the present invention may reduce a gap between the bumper cover 8 and the fender panel 6 and secure the stiffness of the fixing bracket 10, in order to cope with the recent design specification in which the engine room space is narrow and the distance between the upper member 2 and the bumper cover 8 at the side surface of the vehicle body is increased, because the wheel house front member 4 is formed in an oblique direction from the upper member 2.

Furthermore, since a reinforcement member capable of securing stiffness among a wheel guard, a washer reservoir tank, and a head lamp does not need to be separately installed to join the fixing bracket 10, the cost and weight may be reduced.

Furthermore, since the loads in the X-axis, Y-axis, and Z-axis directions may be supported, the structural strength of the vehicle may be improved.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A bumper cover fixing bracket mounted between a fender panel and a bumper cover, comprising:
    a main supporting member having an upper end attached to an upper member;
    an auxiliary supporting member having:
        an upper end attached to a wheel house front member; and
        a lower end directly connected to the main supporting member between the upper end and a lower end of the main supporting member wherein the auxiliary supporting member has a Y-shape with the main supporting member; and
    a fastening member coupled to the lower end of the main supporting member and having a first side and a second side mounted on the fender panel and the bumper cover, respectively.

2. The bumper cover fixing bracket of claim 1, wherein the main supporting member has a bent portion to support loads in X-axis, Y-axis, and Z-axis directions.

3. The bumper cover fixing bracket of claim 1, wherein the main supporting member is attached to be aligned in a downward oblique direction from the upper member.

4. The bumper cover fixing bracket of claim 2, wherein the main supporting member has an upper end portion bent in a Y-Z-axis direction and a lower end portion bent in an X-Z-axis direction, in a direction opposite the bent portion.

5. The bumper cover fixing bracket of claim 2, wherein the bent portion has a welding flange formed at both lateral sides thereof in an oblique direction with respect to the bent portion.

6. The bumper cover fixing bracket of claim 5, wherein the auxiliary supporting member comprises:
    a welding portion formed in an oblique direction to correspond to a position of the welding flange; and
    a connection portion extended and bent from the welding portion and attached to the front member.

7. The bumper cover fixing bracket of claim 6, wherein the welding portion of the auxiliary supporting member is housed in the bent portion through the welding flange and connected to the welding flange in a state where the welding portion overlaps the main supporting member in the bent portion thereof.

8. The bumper cover fixing bracket of claim 6, wherein the connection portion is bent in a Z-X-axis direction.

9. The bumper cover fixing bracket of claim 1, wherein the fastening member is in a triangle shape, and has a flange portion formed on one side thereof so as to be engaged with a lower front portion of the main supporting member through a bolt.

10. The bumper cover fixing bracket of claim 1, wherein the auxiliary supporting member has a bead along a longitudinal direction thereof.

11. The bumper cover fixing bracket of claim 1, wherein the wheel house front member to which the auxiliary supporting member is attached is in an oblique direction from the upper member.

12. The bumper cover fixing bracket of claim 1, wherein the main supporting member is a rectangular tube.

13. The bumper cover fixing bracket of claim 1, wherein the auxiliary supporting member is a rectangular tube.

* * * * *